C. E. CLARK.
Nozzle.
No. 204,950.  Patented June 18, 1878.
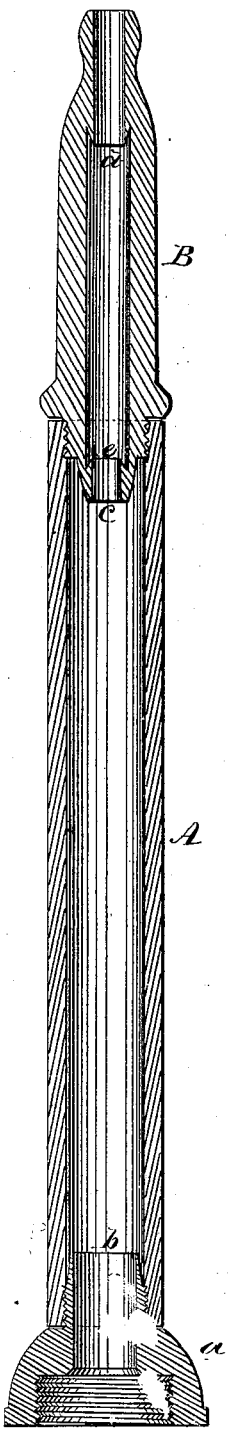
WITNESSES:
Francis McArdle.
C. Sedgwick
INVENTOR:
C. E. Clark
BY Munn & Co
ATTORNEYS.

UNITED STATES PATENT OFFICE.

CHARLES E. CLARK, OF ROCHESTER, NEW HAMPSHIRE.

IMPROVEMENT IN NOZZLES.

Specification forming part of Letters Patent No. 204,950, dated June 18, 1878; application filed December 7, 1877.

*To all whom it may concern:*

Be it known that I, CHARLES E. CLARK, of Rochester, in the county of Strafford and State of New Hampshire, have invented a new and Improved Hose Pipe and Nozzle, of which the following is a specification:

My invention consists in a hose pipe and nozzle made in straight sections of different diameter and provided with an inwardly-projecting annular edge at the inner end of each section, the object being to reduce the friction between the water and inner surface of the pipe and nozzle by dispensing with tapering surfaces and causing a portion of the water to act as a guide or friction surface for the stream passing through the nozzle.

Referring to the drawing, which is a longitudinal section of a hose pipe and nozzle containing my improvements, A is a pipe having at one end an internally-threaded socket, *a*, by which it is connected with the hose-coupling, and at the other end the nozzle B. The portion of the socket that is screwed into the pipe A is beveled on the outside, forming a sharp annular edge, *b*.

The nozzle B is of two diameters internally, being smaller in diameter at each end than it is between the ends. The inner end of the nozzle is tapered externally at its extreme end, forming the sharp annular edge *c*. It is also provided with an annular edge, *e*, that projects into the nozzle. The outer end of the nozzle is provided with an annular edge, *d*, which projects inwardly in the same direction as the edge *c*.

The nozzle is screwed into pipe B at the end opposite the coupling *a*.

The water in passing through the pipe and nozzle is divided by the sharp annular edges, a part of it being retained between the sides of the nozzle and the moving portion of the stream, and acts as a frictionless surface for guiding the jet as it passes through the nozzle.

Having thus described my invention, I claim as new and desire to secure by Letters Patent—

A hose pipe and nozzle consisting of the pipe A, having at one end a socket, *a*, provided with an inwardly-projecting annular edge, *b*, and at the other a nozzle, B, made in two diameters and having the inwardly-projecting annular edges *c d* and the outwardly-projecting edge *e*, as specified.

CHARLES E. CLARK.

Witnesses:
 NAHUM F. WOODMAN,
 HENRY KIMBALL.